(12) United States Patent
Zhong

(10) Patent No.: US 7,680,066 B2
(45) Date of Patent: Mar. 16, 2010

(54) METHOD FOR PROTECTING DIGITAL SUBSCRIBER LINE ACCESS MULTIPLEXER, DSLAM AND XDSL SINGLE SERVICE BOARD

(75) Inventor: Yu Zhong, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 502 days.

(21) Appl. No.: 11/621,667

(22) Filed: Jan. 10, 2007

(65) Prior Publication Data
US 2007/0230348 A1    Oct. 4, 2007

(30) Foreign Application Priority Data
Apr. 4, 2006    (CN) .................... 2006 1 0034897

(51) Int. Cl.
*H04L 12/28* (2006.01)
(52) U.S. Cl. ........................ 370/254; 380/201
(58) Field of Classification Search ........................ None
See application file for complete search history.

(56) References Cited
U.S. PATENT DOCUMENTS
6,647,418 B1    11/2003    Maria et al.

2002/0194506 A1    12/2002    Wiley et al.
2005/0022011 A1    1/2005    Swander et al.
2005/0185705 A1*    8/2005    Tanaka et al. ................ 375/222
2006/0031938 A1*    2/2006    Choi ............................ 726/25
2007/0211626 A1*    9/2007    Gooch et al. ................ 370/229
2007/0234418 A1*    10/2007    Song et al. ..................... 726/15

FOREIGN PATENT DOCUMENTS
WO    02/37730 A2    5/2002

* cited by examiner

*Primary Examiner*—Chi H Pham
*Assistant Examiner*—Fan Ng

(57) ABSTRACT

A method for protecting a Digital Subscriber Line Access Multiplexer (DSLAM) includes: capturing specific protocol packets at an XDSL port by hardware of an XDSL single service board; and sending the captured specific protocol packets to a CPU of the XDSL single service board; determining whether the traffic amount of the specific protocol packets in a time unit exceeds a predefined threshold, if the traffic amount does not exceed the predefined threshold, submitting the specific protocol packets to a CPU of the host; otherwise stopping submitting the specific protocol packets to the CPU of the host. The method and the XDSL single service board provided by embodiments of the present invention need not manually set Media Access Control (MAC) address or maximum MAC address learning number for each XDSL port, which cuts down the maintenance workload, and on the other hand, reduces the loss of important protocol packets and lowers the load of the CPU.

14 Claims, 2 Drawing Sheets

METHOD FOR PROTECTING DIGITAL SUBSCRIBER LINE ACCESS MULTIPLEXER, DSLAM AND XDSL SINGLE SERVICE BOARD

CROSS-REFERENCE TO RELATED APPLICATIONS

This application claims the benefit of Chinese Patent Application No. 200610034897.5 filed on Apr. 4, 2006. The disclosure of the above application is incorporated herein by reference.

FIELD

The present disclosure relates to computer network and telecommunication network technologies, and particularly, to a method for protecting a Digital Subscriber Line Access Multiplexer (DSLAM) a DSLAM and a Digital Subscriber Line (XDSL) single service board.

BACKGROUND

The statements in this section merely provide background information related to the present disclosure and may not constitute prior art.

As operators demand the flattening of broadband networks (i.e., reducing network layers) to save cost, DSLAM performs more functions that used to be performed by layer 2 and layer 3 switches or routers, such as upper-layer protocol packet processing and IP forwarding. Since a large amount of the protocol packets need to be analyzed by software modules in the DSLAM, the load of the CPU in the DSLAM is usually high. The occupancy rate of the CPU may reach even 100% if there are too many protocol packets to be processed, which makes it impossible to process other important processes in time and even starves these processes. The consequence brought about by the heavy load of the CPU is unpredictable and may be extremely serious like resetting of the whole DSLAM.

In the related art there are two protection methods to ensure the safe operation of a DSLAM and protect the DSLAM from the impact of various illegal packets.

In the first method, the number of subscribers accessing to the DSLAM is limited through binding a static Multimedia Access Control (MAC) address to each XDSL port or setting a maximum MAC address learning number for each XDSL port, so as to prevent simultaneous accesses or attacks from multiple terminals on the subscriber side, and thereby protecting the DSLAM.

In the second method, in order to protect the DSLAM from the attack of a single subscriber who sends large amounts of protocol packets to the DSLAM with a packet-sending tool, the software module of the DSLAM analyzes the traffic amount of the protocol packets (regardless of the type of the protocol packets) that need to be processed during a time unit, limits the traffic amount of the protocol packets to be processed per second and directly discards the excessive protocol packets (regardless of the type of the protocol packets).

The attacking packets currently on the network are usually initiated from the subscriber side, i.e., the XDSL access side, where illegal subscribers send large amounts of packets to upper layer networks with packet-sending tools. The DSLAM mainly processes Address Resolution Protocol (ARP) packets, Internet Group Management Protocol (IGMP) packets, PPP over Ethernet (PPPOE) packets and Dynamic Host Configuration Protocol (DHCP) packets, if the subscriber side sends large amounts of these packets to the DSLAM and the DSLAM has to process all of these packets from the subscriber side, the load of the CPU in the DSLAM will be very heavy and may put the DSLAM at the risk of reset.

SUMMARY

Embodiments of the present invention provide a method for protecting a Digital Subscriber Line Access Multiplexer (DSLAM), a DSLAM and a Digital Subscriber Line (XDSL) single service board. The method and the XDSL single service board provided by the embodiments of the present invention need not manually set Media Access Control (MAC) address or maximum MAC address learning number for each XDSL port, which cuts down the maintenance workload, and on the other hand, reduces the loss of important protocol packets and lowers the load of a Central Processing Unit (CPU).

According to an embodiment of the present invention, the method for protecting a DSLAM includes the following steps:

capturing, by hardware of the XDSL single service board, specific protocol packets from an XDSL port of the XDSL single service board; and sending, by the hardware of the XDSL single service board, the specific protocol packets captured to a CPU of the XDSL single service board;

determining, by the CPU of the XDSL single service board, whether the traffic amount of the specific protocol packets in a time unit exceeds a predefined threshold, and if the traffic amount of the specific protocol packets does not exceed the predefined threshold, submitting the specific protocol packets to a CPU of a host for further processing; otherwise, stopping submitting the specific protocol packets to the CPU of the host.

Another embodiment of the present invention provides an XDSL single service board, including:

an XDSL port;

hardware of the XDSL single service board, configured to capture specific protocol packets at the XDSL port and send the specific protocol packets;

a CPU of the XDSL single service board, configured to determine whether the traffic amount of the specific protocol packets in a time unit exceeds a predefined threshold, submit the specific protocol packets to a CPU of the host for further processing if the traffic amount of the specific protocol packets does not exceed the predefined threshold, and stop submitting the specific protocol packets to the CPU of the host if the traffic amount of the specific protocol packets exceeds the predefined threshold.

A Digital Subscriber Line Access Multiplexer (DSLAM), includes:

a host, equipped with a Central Processing Unit (CPU), and configured to process specific protocol packets received;

a XDSL single service board, connected with the host, and configured to capture specific protocol packets and determine whether the traffic amount of the specific protocol packets in a time unit exceeds a predefined threshold, if the traffic amount of the specific protocol packets does not exceed the predefined threshold, submit the specific protocol packets to the CPU of the host for processing; otherwise, stop submitting the specific protocol packets to the CPU of the host.

Through the fore-going technical scheme, each CPU of the XDSL single service board in the DSLAM limits the traffic amount of the specific protocol packets. Therefore, the loss of important protocol packets is reduced, and the CPU of the host is freed from processing redundant protocol packets and the load of the CPU is thus lowered. The CPU of the host in the DSLAM only processes the protocol packets sent from the CPU of the XDSL single service boards, while the differentiation of the protocol packets and the traffic restriction are performed by each CPU of the XDSL single service board, thus the protection efficiency of the DSLAM against mass protocol packets are enhanced and the DSLAM is secured from the attack of illegal packets. The embodiment of the present invention may configure the traffic amount threshold for the protocol packets and the time delay to re-open an XDSL port according to practical requirements to implements a port-level restriction, which, without influencing normal connections of legal subscribers, or even without influencing normal services of the illegal subscribers, increases the flexibility of the DSLAM with regard to the protection against illegal protocol packets and effectively limits the impact on the DSLAM caused by mass illegal packets from specific subscribers. Normal protocol packets and other services will still be processed by the host undisturbed under attack. The technical scheme provided by the embodiment of the present invention is easy to implement and maintain without manual configuration, which reduces the workload of maintenance.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
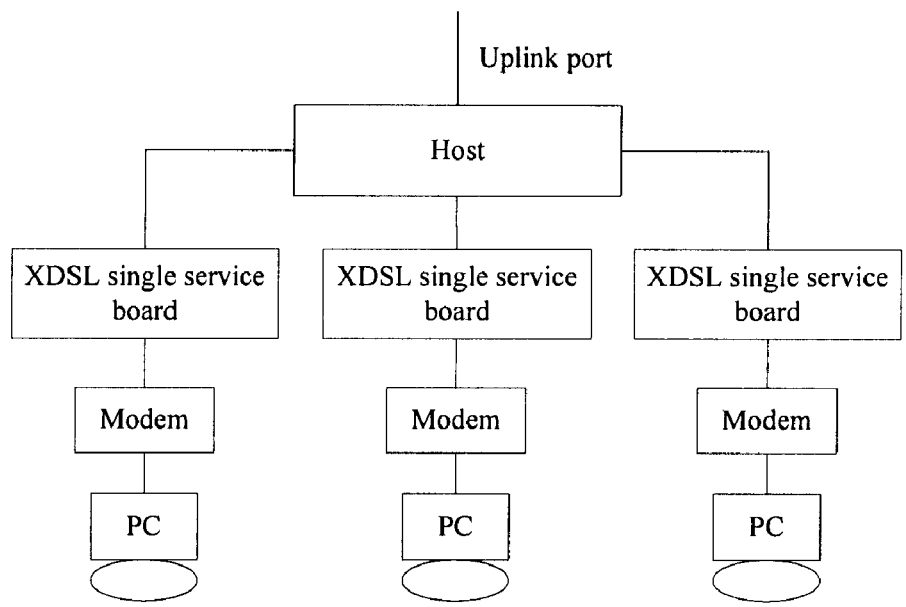
FIG. 1 is a schematic diagram illustrating a distributed bus network with a DSLAM device according to an embodiment of the present invention.

The following description is merely exemplary in nature and is not intended to limit the present disclosure, application, or uses. It should be understood that throughout the drawings, corresponding reference numerals indicate like or corresponding parts and features.

The present invention is further explained hereinafter with reference to accompanying drawings and an embodiment in which Digital Subscriber Line (XDSL) is employed.

FIG. 1 is a schematic diagram illustrating a distributed bus networking with a DSLAM. The rectangle encircled by dotted lines in FIG. 1 is a DSLAM device including a host and several XDSL single service boards respectively connected to the host. The uplink port of the host is connected to an upper layer network, and each Personal Computer (PC) on the subscriber side is connected to a corresponding XDSL single service board via a Modem. The host is equipped with a CPU and each XDSL single service board is also equipped with a CPU. In a normally functioning network, all kinds of protocol packets from the PCs on the subscriber side are sent to the host through the Modems and the XDSL single service boards. When a protocol packet from the PC on the subscriber side reaches the XDSL single service board, the hardware of the XDSL single service board captures the protocol packet, sends the protocol packet to the CPU of the XDSL single service board, and finally forwards the protocol packet to the CPU of the host for centralized processing.

Figure 2:
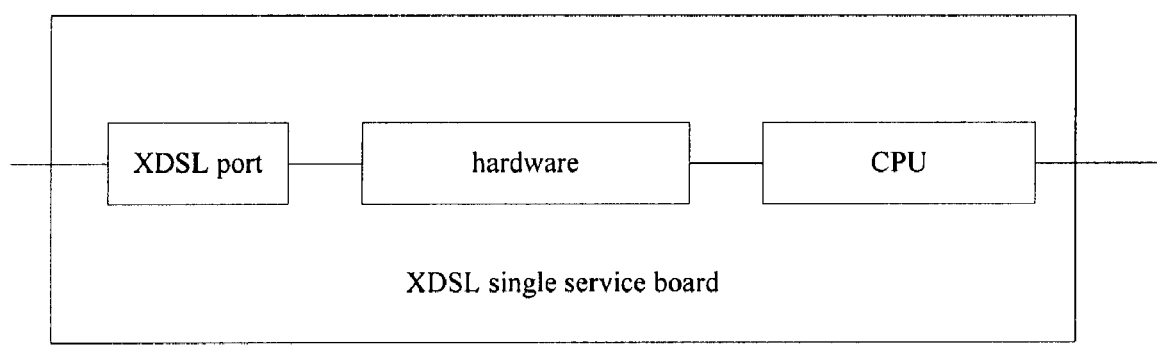
FIG. 2 is a schematic diagram illustrating a structure of an XDSL single service board according to an embodiment of the present invention.

FIG. 2 is a schematic diagram illustrating a structure of an XDSL single service board, including an XDSL port, hardware and a CPU.

The hardware is configured to capture specific protocol packets at the XDSL port and send the specific protocol packets captured to the CPU; and the CPU of the XDSL single service board is configured to determine whether the traffic amount of the specific protocol packets in a time unit exceeds a predefined threshold, submit the specific protocol packets to the CPU of the host for further processing if the traffic amount of the specific protocol packets does not exceed the predefined threshold, and stop submitting the specific protocol packets to the CPU of the host if the traffic amount of the specific protocol packets exceeds the predefined threshold.

The CPU of the single service board is further configured to send to the host a message indicating that there is an attack on the XDSL port, and discard the specific protocol packets when it is determined that the traffic amount of the specific protocol packets exceeds the predefined threshold.

Figure 3:
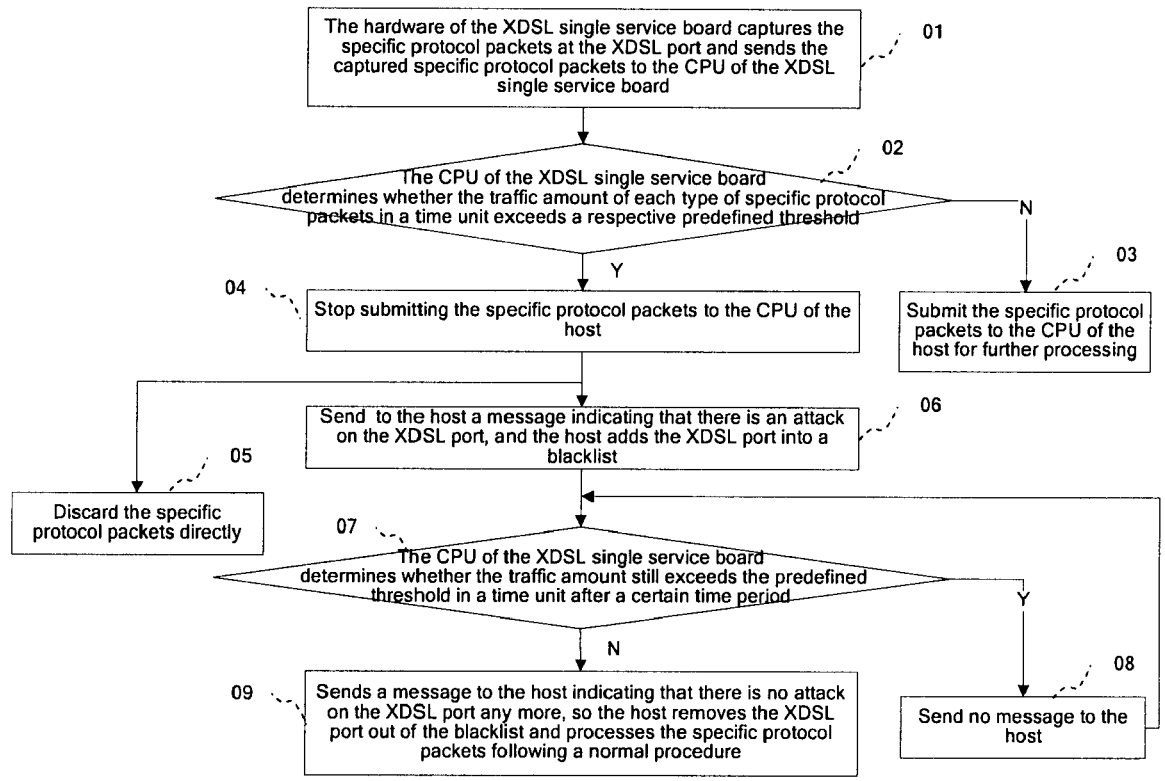
FIG. 3 is a flowchart of the DSLAM device protection method according to an embodiment of the present invention.

FIG. 3 is a flowchart of the DSLAM device protection method according to an embodiment of the present invention. The method may automatically detects the traffic amount of specific protocol packets for each XDSL subscriber in a time unit, when it is detected that the traffic amount of the specific protocol packets from an XDSL subscriber in a time unit exceeds a threshold, a traffic restriction shall be applied to the XDSL subscriber who has sent excessive specific protocol packets that exceed the threshold, and the XDSL subscriber shall be listed in a blacklist under the centralized management of the host. After a certain period of time, the traffic amount of the specific protocol packets of the XDSL subscriber in the blacklist shall be checked again to determine whether the traffic restriction shall be removed. The method includes the following steps.

Step 01: the hardware of the XDSL single service board captures specific protocol packets at the XDSL port, through which the XDSL single service board is connected to the Modem, as shown in FIG. 1, and sends the captured protocol packets to the CPU of the XDSL single service board.

Step 02: the CPU of the XDSL single service board determines the type of the received protocol packets, and determines whether the traffic amount of each type of the specific protocol packets in a time unit exceeds a respective predefined threshold, and if the traffic amount of each type of the specific protocol packets does not exceed their respective predefined threshold, proceed to Step 03; otherwise, proceed to Step 04.

Step 03, submit the protocol packets to the CPU of the host for further process and end the procedure.

Step 04, stop submitting the protocol packets to the CPU of the host.

Step 05~06, the CPU of the XDSL single service board directly discards the protocol packets. And at the same time, the CPU of the XDSL single service board sends a message to the host indicating that there is an attack on the XDSL port; and the host, without processing the protocol packets submitted by the XDSL port, adds the XDSL port into a blacklist.

Step 07, the CPU of the XDSL single service board determines whether the traffic amount of the specific protocol packets in a time unit still exceeds the predefined threshold after a certain time period; if the traffic amount of the specific protocol packets still exceeds the threshold, proceed to Step 08; otherwise, proceed to step 09.

Step 08, the CPU of the XDSL single service board does not send message to the host and checks the traffic amount of specific protocol packets in a time unit again after a certain time period, and Step 08 is repeated until the traffic amount of the specific protocol packets falls below the threshold.

Step 09, the CPU of the XDSL single service board sends a message to the host indicating that there is no attack on the XDSL port any more, so the host terminates the restriction applied to the XDSL port, removes the XDSL port out of the blacklist, receives and processes the protocol packets following a normal procedure.

When there is an attack on the XDSL port, the CPU of the XDSL single service board stops submitting the specific protocol packets to the CPU of the host, which reduces the load of the CPU of the host; meanwhile, since the host need not process the specific protocol packets submitted by the XDSL port, the load of the CPU of the host is not heavy. The packets from the PCs on the subscriber side are mainly service streams which include a few protocol packets, while the XDSL single service board captures only specific protocol packets to the CPU of the host for processing, other service streams of the XDSL port are forwarded by the hardware of the XDSL single service board so as to guarantee the normal operation of the service streams while isolating attacking packets.

It should be noted that the specific protocol packets may include one or any combination of the following categories: Address Resolution Protocol (ARP) packet, Internet Group Management Protocol (IGMP) packet, PPP over Ethernet (PPPOE) packet and Dynamic Host Configuration Protocol (DHCP) packet. A subscriber may make his own choice according to the practical networking environment and his own features so that the protection flexibility as well as the protection ability of the DSLAM device against attacking protocol packets are improved.

Each CPU of the XDSL single service board of the DSLAM in the embodiment of the present invention determines the type of the protocol packets received in a time unit from a corresponding XDSL port and limits the traffic amount of the protocol packets accordingly to cut down the traffic amount of the protocol packets from the XDSL port to a reasonable level and protect the DSLAM from the attack of illegal packets. Therefore, the loss of important protocol packets is reduced, and at the same time, the CPU of the host is freed from processing redundant protocol packets and the load of the CPU of the host is lowered.

The above mentioned are only preferred embodiments of the invention, which are not used for limiting the protection scope of the present invention as defined by the following claims.

What is claimed is:

1. A method for protecting a Digital Subscriber Line Access Multiplexer (DSLAM), comprising:
   capturing, by hardware of a Digital Subscriber Line (XDSL) single service board, specific protocol packets at an XDSL port; and
   sending, by the hardware of the XDSL single service board, the specific protocol packets captured to a Central Processing Unit (CPU) of the XDSL single service board;
   determining, by the CPU of the XDSL single service board, whether the traffic amount of the specific protocol packets in a time unit exceeds a predefined threshold, and if the traffic amount of the specific protocol packets does not exceed the predefined threshold, submitting the specific protocol packets to a CPU of a host for processing; otherwise, stopping submitting the specific protocol packets to the CPU of the host, upon stopping submitting the specific protocol packets to the CPU of the host, sending, by the CPU of the XDSL single service board, to the host a message indicating that there is an attack on the XDSL port, and adding the XDSL port into a blacklist, after adding the XDSL port into the blacklist by the host, determining, by the CPU of the XDSL single service board, whether the traffic amount of the specific protocol packets in a time unit still exceeds the predefined threshold, and if the traffic amount of the specific protocol packets does not exceed the predefined threshold, sending a message by the CPU of the XDSL single service board to the host indicating that there is no attack on the XDSL port, removing, by the host, the XDSL port out of the blacklist, receiving and processing the specific protocol packets by the host; otherwise, sending no message to the host by the CPU of the XDSL single service board.

2. The method of claim 1, further comprising:
   determining, by the CPU of the XDSL single service board, the type of the specific protocol packets after the hardware of the XDSL single service board sends the specific protocol packets captured to the CPU of the XDSL single service board; and
   the process of determining whether the traffic amount of the specific protocol packets in a time unit exceeds a predefined threshold comprising: determining, by the CPU of the XDSL single service board, whether the traffic amount of each type of the specific protocol packets in a time unit exceeds a respective predefined threshold, and if the traffic amount of each type of the specific protocol packets does not exceed their respective predefined threshold, submitting each type of the specific protocol packets to the CPU of the host for further processing; otherwise, stopping submitting each type of the specific protocol packets to the CPU of the host.

3. The method of claim 1, wherein the process of determining whether the traffic amount of the specific protocol packets in a time unit still exceeds the predefined threshold by the CPU of the XDSL single service board is performed at regular intervals.

4. The method of claim 1, further comprising:
   upon stopping submitting the specific protocol packets to the CPU of the host, discarding, by the CPU of the XDSL single service board, the specific protocol packets.

5. The method of claim 1, wherein the specific protocol packets include one or any combination of the followings:
   Address Resolution Protocol (ARP) packet, Internet Group Management Protocol (IGMP) packet, PPP over Ethernet (PPPOE) packet and Dynamic Host Configuration Protocol (DHCP) packet.

6. The method of claim 1, wherein the specific protocol packets are Address Resolution Protocol (ARP) packets, or Internet Group Management Protocol (IGMP) packets, or PPP over Ethernet (PPPOE) packets, or Dynamic Host Configuration Protocol (DHCP) packets.

7. A Digital Subscriber Line (XDSL) single service board, comprising:
   an XDSL port;
   an element configured to capture specific protocol packets at the XDSL port and send the specific protocol packets;
   a Central Processing Unit (CPU), configured to determine whether the traffic amount of the specific protocol packets in a time unit exceeds a predefined threshold, submit the specific protocol packets to a CPU of the host for processing if the traffic amount of the specific protocol packets does not exceed the predefined threshold, and stop submitting the specific protocol packets to the CPU of the host if the traffic amount of the specific protocol packets exceeds the predefined threshold, upon stopping submitting the specific protocol packets to the CPU of the host, sending, by the CPU of the XDSL single service board, to the host a message indicating that there is an attack on the XDSL port, and adding the XDSL port into a blacklist, after adding the XDSL port into the blacklist by the host, determining, by the CPU of the XDSL single service board, whether the traffic amount of the specific protocol packets in a time unit still exceeds the predefined threshold, and if the traffic amount of the specific protocol packets does not exceed the predefined threshold, sending a message by the CPU of the XDSL single service board to the host indicating that there is no attack on the XDSL port, removing, by the host, the XDSL port out of the blacklist, receiving and processing the specific protocol packets by the host; otherwise, sending no message to the host by the CPU of the XDSL single service board.

8. The XDSL single service board of claim 7, wherein the CPU of the XDSL single service board is adapted to send to the host a message indicating that there is an attack on the XDSL port and discard the specific protocol packets when it is determined that the traffic amount of the specific protocol packets exceeds the predefined threshold.

9. The XDSL single service board of claim 7, wherein the specific protocol packets are Address Resolution Protocol (ARP) packets, or Internet Group Management Protocol (IGMP) packets, or PPP over Ethernet (PPPOE) packets, or Dynamic Host Configuration Protocol (DHCP) packets.

10. A Digital Subscriber Line Access Multiplexer (DSLAM), comprising:
a host, equipped with a Central Processing Unit (CPU), and configured to process specific protocol packets;
a Digital Subscriber Line (XDSL) single service board, connected with the host, and configured to capture specific protocol packets and determine whether the traffic amount of the specific protocol packets in a time unit exceeds a predefined threshold, if the traffic amount of the specific protocol packets does not exceed the predefined threshold, submit the specific protocol packets to the CPU of the host for processing; otherwise, stop submitting the specific protocol packets to the CPU of the host, upon stopping submitting the specific protocol packets to the CPU of the host, sending, by the CPU of the XDSL single service board, to the host a message indicating that there is an attack on the XDSL port, and adding the XDSL port into a blacklist, after adding the XDSL port into the blacklist by the host, determining by the CPU of the XDSL single service board, whether the traffic amount of the specific protocol packets in a time unit still exceeds the predefined threshold, and if the traffic amount of the specific protocol packets does not exceed the predefined threshold, sending a message by the CPU of the XDSL single service board to the host indicating that there is no attack on the XDSL port, removing, by the host, the XDSL port out of the blacklist, receiving and processing the specific protocol packets by the host; otherwise, sending no message to the host by the CPU of the XDSL single service board.

11. The DSLAM of claim 10, wherein the XDSL single service board comprises:
an XDSL port;
an element configured to capture specific protocol packets at the XDSL port and send the specific protocol packets;
a Central Processing Unit (CPU), configured to determine whether the traffic amount of the specific protocol packets in a time unit exceeds a predefined threshold, submit the specific protocol packets to a CPU of the host for processing if the traffic amount of the specific protocol packets does not exceed the predefined threshold, and stop submitting the specific protocol packets to the CPU of the host if the traffic amount of the specific protocol packets exceeds the predefined threshold.

12. The DSLAM of claim 11, wherein the CPU of the XDSL single service board is adapted to send to the host a message indicating that there is an attack on the XDSL port and discard the specific protocol packets when it is determined that the traffic amount of the specific protocol packets exceeds the predefined threshold.

13. The DSLAM of claim 10, wherein the CPU of the host is further configured to adding the XDSL port into a black list when there is an attack on the XDSL port; and
removing the XDSL port out of the black list when there is no attack on the XDSL port.

14. The DSLAM of claim 10, wherein the specific protocol packets are Address Resolution Protocol (ARP) packets, or Internet Group Management Protocol (IGMP) packets, or PPP over Ethernet (PPPOE) packets, or Dynamic Host Configuration Protocol (DHCP) packets.

* * * * *